(12) United States Patent  (10) Patent No.: US 7,786,684 B2
Hanlon et al.  (45) Date of Patent: Aug. 31, 2010

(54) ELECTROMECHANICAL FLIGHT CONTROL SYSTEM AND METHOD FOR ROTORCRAFT

(75) Inventors: Casey Hanlon, Queen Creek, AZ (US); James I. Kern, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 302 days.

(21) Appl. No.: 11/876,456

(22) Filed: Oct. 22, 2007

(65) Prior Publication Data

US 2009/0102413 A1  Apr. 23, 2009

(51) Int. Cl.
*H02K 41/00* (2006.01)

(52) U.S. Cl. .............. 318/135; 318/551; 318/738

(58) Field of Classification Search .......... 318/135, 318/551, 738, 244, 603, 779, 139, 801; 310/219
See application file for complete search history.

(56) References Cited

U.S. PATENT DOCUMENTS

| 3,679,156 | A | 7/1972 | Redmond |
|---|---|---|---|
| 4,040,445 | A | 8/1977 | McCormick |
| 4,243,358 | A | 1/1981 | Carlock et al. |
| 4,445,421 | A | 5/1984 | Walker et al. |
| 4,899,641 | A | 2/1990 | Khan |
| 5,007,459 | A | 4/1991 | Asaoka |
| 5,091,665 | A | 2/1992 | Kelly |
| 5,108,070 | A | 4/1992 | Tominaga |
| 5,121,042 | A | 6/1992 | Ako |
| H1191 | H | 6/1993 | Hutchinson et al. |
| 5,661,446 | A | 8/1997 | Anderson et al. |
| 5,909,066 | A | 6/1999 | Nanba et al. |
| 5,955,798 | A | 9/1999 | Ishiyama et al. |
| 5,990,583 | A | 11/1999 | Nanba et al. |
| 2002/0180279 | A1* | 12/2002 | Faizullabhoy et al. ......... 310/12 |
| 2003/0127917 | A1 | 7/2003 | Kang et al. |
| 2004/0124717 | A1* | 7/2004 | Corcoran et al. .............. 310/12 |

* cited by examiner

*Primary Examiner*—Karen Masih
(74) *Attorney, Agent, or Firm*—Ingrassia Fisher & Lorenz, P.C.

(57) ABSTRACT

Flight control systems and methods for rotorcraft are provided. The flight control system includes a user input device and a motor in operable communication with the user input device. The motor includes a plurality of winding sets and an armature coupled to the plurality of winding sets. The armature includes multiple magnets. The winding sets and the armature are configured such that when one or more of the plurality of winding sets are selectively energized, the armature moves relative to the one or more of the plurality of winding sets.

20 Claims, 7 Drawing Sheets

ELECTROMECHANICAL FLIGHT CONTROL SYSTEM AND METHOD FOR ROTORCRAFT

TECHNICAL FIELD

The present invention relates to flight control systems for rotorcraft, and more particularly, to an electromechanical flight control system and method for rotorcraft.

BACKGROUND

In rotorcraft such as helicopters, the control of the rotors, and other flight control surfaces, is conventionally performed by a series of mechanical interconnections between the flight controls (e.g., a cyclic, a collective, torque pedals, etc.) and the rotors. In modern helicopters, flight control systems typically include a vast collection of mechanical parts such as rods, cables, pulleys and sometimes chains. Additionally, because of the size and power of the vehicles, complex hydraulic circuits, including hydraulic pumps, pipes, valves, and actuators, are also included to assist the pilot in controlling the rotors. Such flight control systems are often referred to as "hydromechanical" or "fly-by-line."

The complexity of modern hydromechanical systems is even further increased when the required redundancy and back-up systems are installed to ensure that the pilot is able to maintain control of the aircraft in the event that the primary flight control system fails. Even with the back-up systems, there is still the possibility that one of the mechanical links will become jammed, thus increasing the effort required to control the aircraft by the pilot. The resulting flight control system requires countless parts and immensely contributes to the overall cost of the helicopter.

Accordingly, it is desirable to provide a flight control system and method for rotorcraft that reduces the number of components in, as well as the overall weight and costs of, the vehicle, while providing the pilot with reliable and redundant control. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment, a flight control system for a rotorcraft having a frame and a rotor is provided. The flight control system includes a user input device coupled to the frame and a motor in operable communication with the user input device and coupled to the frame and the rotor. The motor includes a plurality of winding sets and an armature coupled to the plurality of winding sets and including a plurality of magnets. The plurality of winding sets and the armature are configured such that when one or more of the winding sets is selectively energized, the armature moves relative to the one or more of the winding sets. The movement of the armature causing the rotor to move relative to the frame.

In another embodiment, a flight control system for a rotorcraft is provided. The flight control system includes a flight control device configured to receive user input and generate a flight control signal representative thereof, a motor in operable communication with the flight control device, and a motor controller in operable communication with the flight control device and the motor. The motor includes a plurality of winding sets and an armature coupled to the plurality of winding sets and including a plurality of magnets. The plurality of windings sets and the magnets are configured such that when one or more of the winding sets is selectively energized, the armature moves relative to the one of more winding sets. The motor controller is configured to receive the flight control signal and selectively energize the one or more of the winding sets based on the flight control signal.

In a further embodiment, a method for controlling a rotorcraft is provided. A manual user input is received with a flight control device. A flight control signal representative of the manual user input is generated. An electric motor is operated based on the flight control signal. The electric motor includes a plurality of winding sets and an armature coupled to the plurality of winding sets and including a plurality of magnets. The plurality of windings sets and the magnets are configured such that when one or more of the winding sets is selectively energized, the armature moves relative to the one of more of the winding sets.

BRIEF DESCRIPTION OF THE DRAWINGS

The present invention will hereinafter be described in conjunction with the appended drawing figures, wherein like numerals denote like elements, and in which.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices.

It should be appreciated that the particular implementations shown and described herein are illustrative of the invention and its best mode and are not intended to otherwise limit the scope of the invention in any way. It should also be understood that FIGS. 1-7 are merely illustrative and may not be drawn to scale.

FIG. 1 to FIG. 7 illustrate a flight control system for a rotorcraft, according to one embodiment of the present invention. The flight control system includes a user input device coupled to a frame of the rotorcraft and a motor in operable communication with the user input device and coupled to the frame and a rotor of the rotorcraft. The motor includes multiple windings sets and an armature, having a plurality of magnets, coupled to the winding sets. The winding sets and the magnets are configured such that when a current flows through one or more of the windings (i.e., when one or more of the winding sets is selectively energized or commutated), the armature moves relative to the one or more of the winding sets. The movement of the armature causes the rotor to move relative to the frame (e.g., the armature moves a control valve spool which causes a hydraulic cylinder to move to swash plate coupled to the rotor). The use of multiple winding sets allows for the use of a reliable "fly-by-wire" flight control system.

Figure 1:
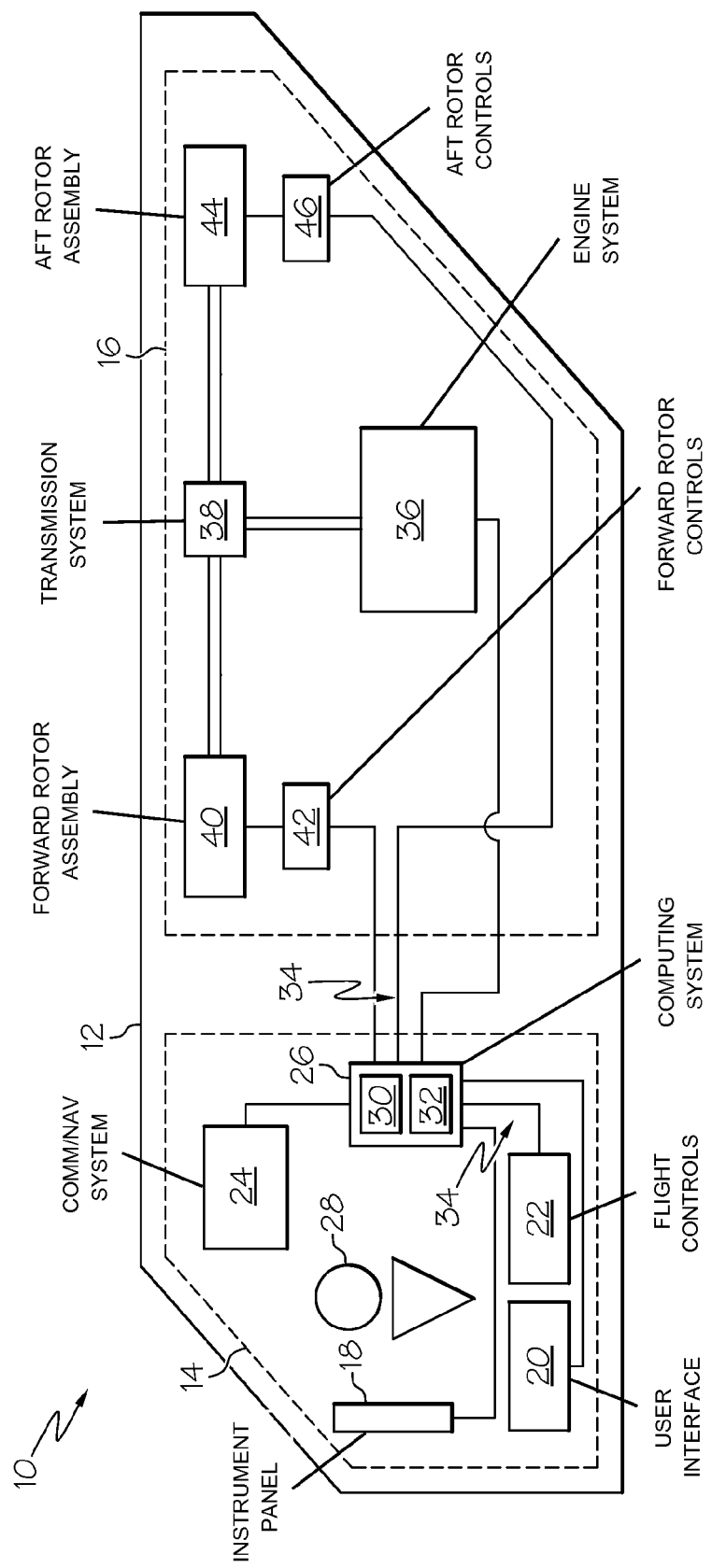
FIG. 1 is a block diagram schematically illustrating a helicopter including a flight deck and a flight system.

FIG. 1 schematically illustrates a rotorcraft, or helicopter 10, according to one embodiment of the present invention. In the depicted embodiment, the helicopter 10 includes a frame 12, a flight deck (or cockpit) 14, and a flight system 16. The flight deck 14 and the flight system 16 are connected to and/or housed within the frame 12, as is commonly understood. It should be noted that the helicopter 10 is merely exemplary and could be implemented without one or more of the depicted components, systems, and data sources and/or with additional components, systems, and data sources not shown.

Still referring to FIG. 1, the flight deck 14 includes an instrument panel 18, a user interface 20, flight controls 22, communications and navigation system 24, and a computing system 26. The instrument panel 18 includes various gauges and display devices (e.g., a primary flight display (PFD)) visible to a user (or pilot) 28 of the helicopter 10 and is in operable communication with the computing system 26. The user interface 20 is configured to receive input from the user 28 and, in response to the user input, supply command signals to the communications and navigation system 24 and the computing system 26. The user interface 20 may be any one, or combination, of various known user interface devices including, but not limited to, a cursor control device (CCD), such as a mouse, a trackball, or joystick, and/or a keyboard, one or more buttons, switches, or knobs. Still referring to FIG. 1, the flight controls (or flight control devices) 22, in one embodiment, include a cyclic (or cyclic stick), a collective (or collective lever), rudder pedals, and a throttle, as is commonly understood, all of which are in operable communication with the computing system 26 and configured to receive user input (e.g., manual user input from a pilot) and generate a signal representative of the user input.

Although not illustrated in detail, the communications and navigation system 24 includes, for example, a communications radio, a navigation radio, navigational databases, as well as additional subsystems such as a Global Positioning Satellite (GPS) module, an Automatic Direction Finder (ADF), and a terrain avoidance warning system (TAWS), as well as various sensors, such as a barometric pressure sensor, a thermometer, an air speed sensor, and an angle of attack sensor.

The computing system, or processor, 26 may include any one of numerous known general-purpose microprocessors or an application specific processor that operates in response to program instructions. In the depicted embodiment, the processor 26 includes on-board random access memory (RAM) 30 and on-board read only memory (ROM) 32 that include instructions stored thereon (or on another computer-readable medium) for carrying out the processes and methods described below. The program instructions that control the processor 26 may be stored in either or both the RAM 30 and the ROM 32. For example, the operating system software may be stored in the ROM 32, whereas various operating mode software routines and various operational parameters may be stored in the RAM 30. It will be appreciated that this is merely exemplary of one scheme for storing operating system software and software routines, and that various other storage schemes may be implemented. It will also be appreciated that the processor 26 may be implemented using various other circuits, not just a programmable processor. For example, digital logic circuits and analog signal processing circuits could also be used. The computing system 26 is in operable communication with the other components on the flight deck 14 via a data bus (or avionics bus) 34.

Still referring to FIG. 1, the flight system 16 includes an engine system 36, a transmission system 38, a forward rotor assembly 40, forward rotor controls 42, an aft rotor assembly 44, and aft rotor controls 46. In one embodiment, as shown in the embodiment depicted in FIG. 2, the engine system 36 includes one or more turbine engines 48, each of which includes a turbo machinery casing having a substantially cylindrical shape and covering various turbo machinery components, such as a shaft and various disks (e.g., compressors and turbines) connected to the shaft, as is commonly understood in the art.

Figure 2:
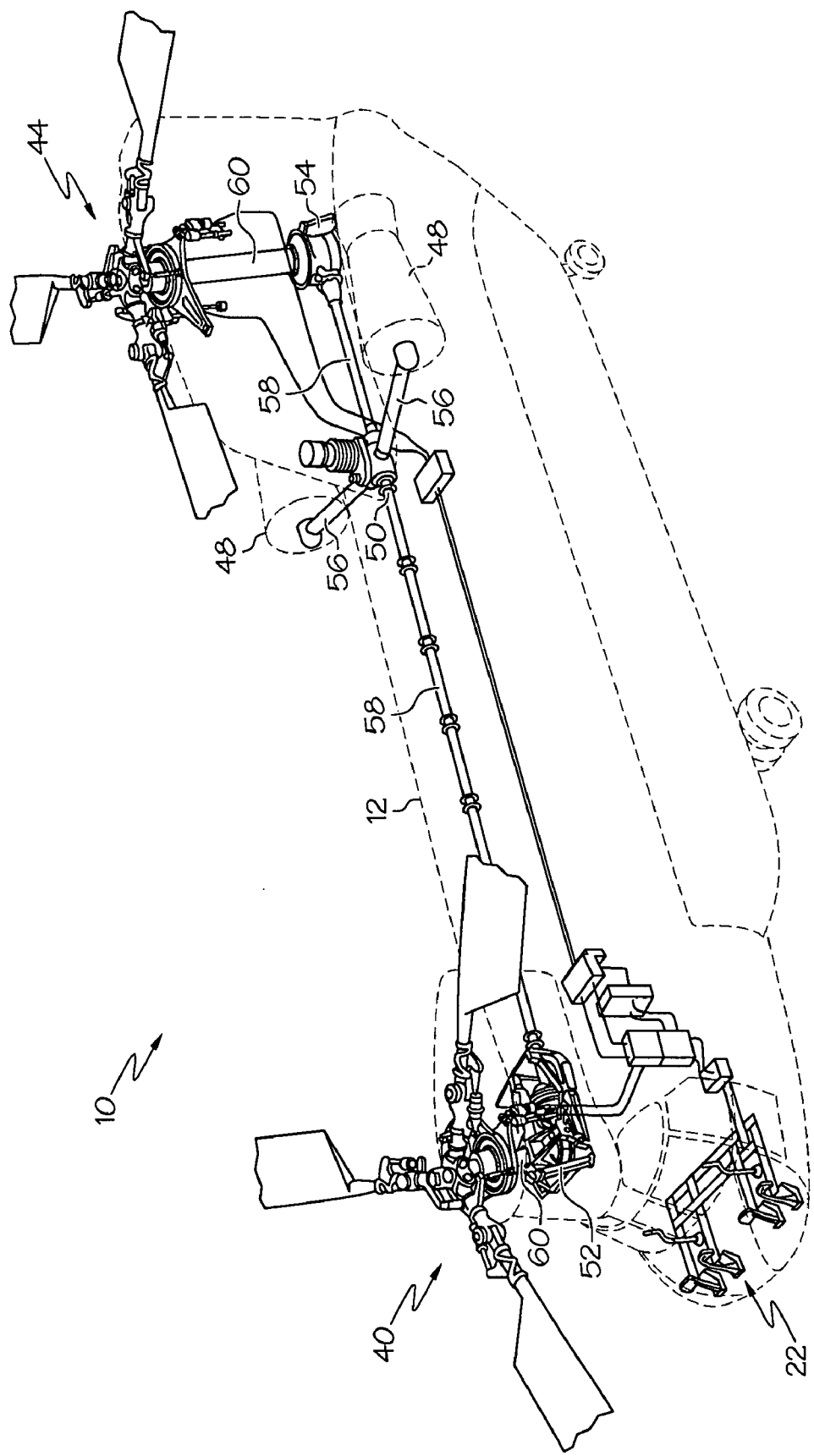
FIG. 2 is a partially transparent isometric view of the helicopter of FIG. 1.

Referring to FIGS. 1 and 2, the transmission system 38 includes a combining transmission 50, a forward transmission 52, and an aft transmission 54, as are well known in the art. The combining transmission 50 is coupled to the turbines 48 by engine drive shafts 56 and to the forward and aft transmissions 52 and 54 by transmission driveshafts 58. A vertical drive shaft 60 is coupled to, and extends substantially vertically from, each of the forward and aft transmissions 52 and 54. In the depicted embodiment, the helicopter 10 is a "tandem" helicopter, as is commonly understood, and as such both rotor assemblies 40 and 44 are include "main" rotors, as described below.

Figure 3:
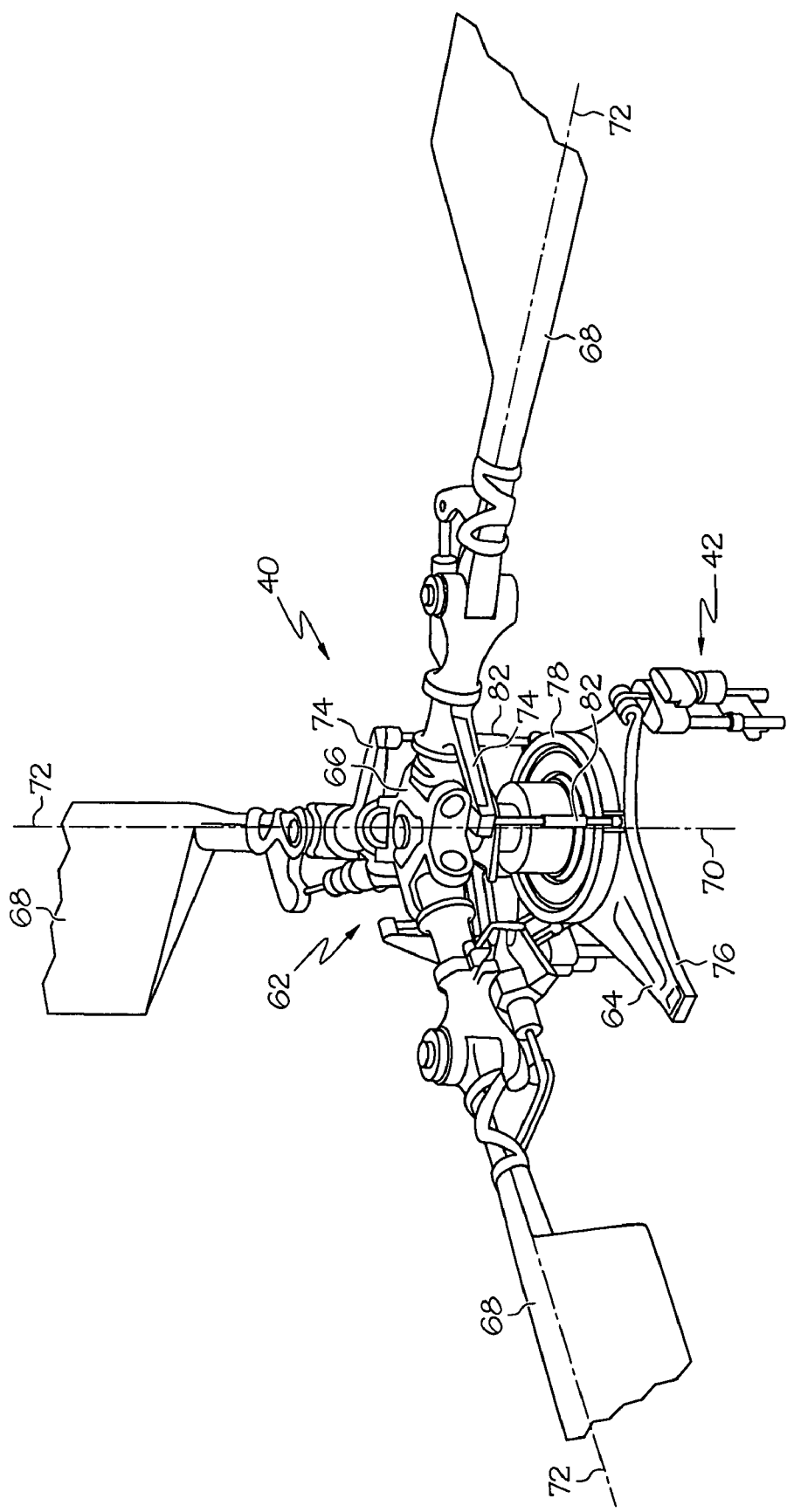
FIG. 3 is an isometric view of a rotor assembly having a rotor and rotor controls on the helicopter of FIG. 1.
Figure 4:
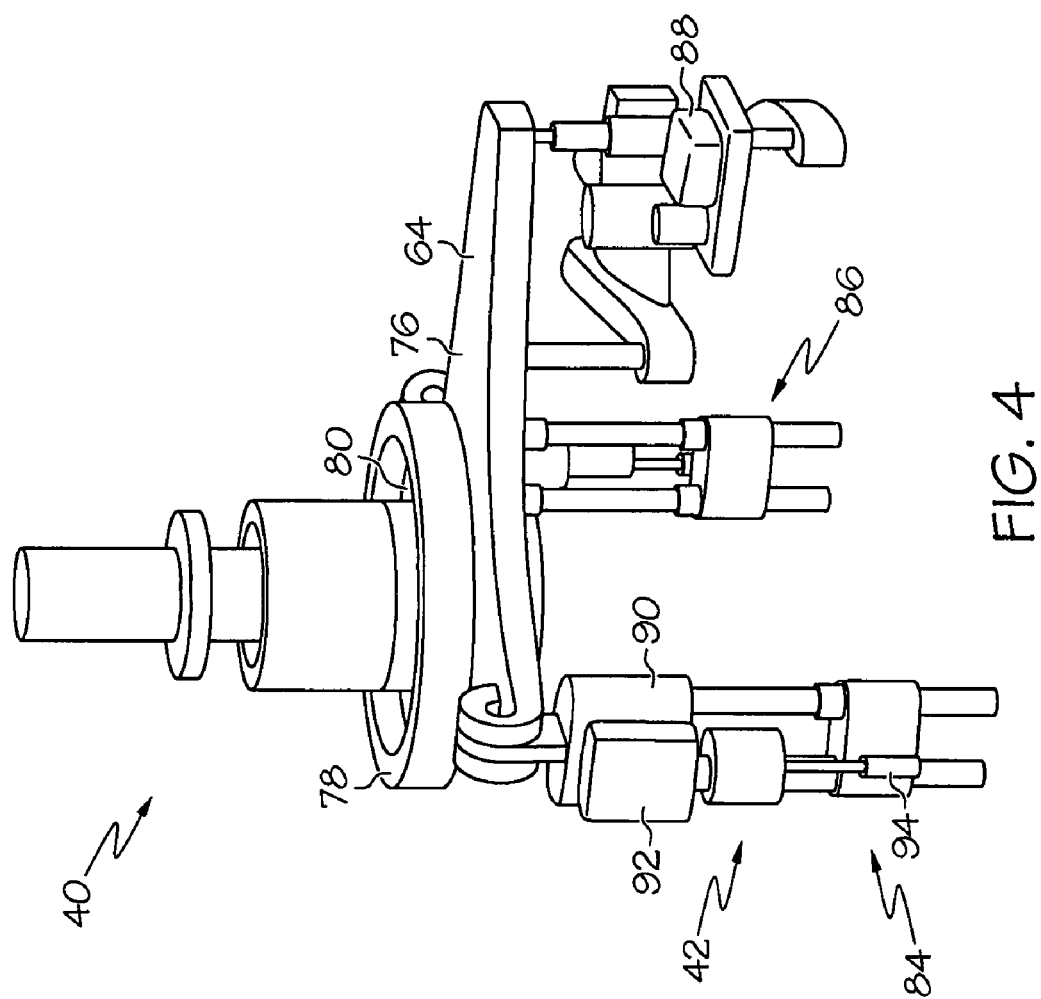
FIG. 4 is an isometric view of the rotor assembly and rotor controls of FIG. 3 with the rotor removed.

FIGS. 3 and 4 illustrate the forward rotor assembly 40 and forward rotor controls 42 in greater detail. The forward rotor assembly 40 includes a rotor 62 and a swash plate 64. The rotor 62 includes a hub 66 and multiple rotor blades 68. The hub 66 is coupled to the forward transmission 52 through one of the vertical driveshafts 60 to rotate about a vertical axis 70, as well as tilt relative to the vertical axis 70, as is described below. Also as described below, each of the rotor blades 68 is coupled to the hub 66 to rotate, or "pitch," about horizontal axes 72, each of which substantially intersects the vertical axis 70. Each blade 68 includes a pitch arm 74 extending therefrom at a central portion thereof.

The swash plate 64 includes a stationary portion 76 and a rotating portion 78 which jointly form a shaft opening 80 through which one of the vertical driveshafts 60 extends. The rotating portion 78 is rotatably coupled to the stationary portion 76 and connected to the pitch arms 74 on the blades 68 by swash plate arms 82.

Referring to FIG. 4, the forward rotor controls 42 include two servocylinder assemblies 84 and 86 on opposing sides of the vertical shaft 60 extending from the forward transmission 52 and a tilt actuator 88 (shown only in FIG. 4). Each of the servocylinder assemblies 84 and 86 includes a servocylinder 90, a control valve 92, and a control actuator 94. In one embodiment, the servocylinder 90 includes one or more hydraulic cylinders having a barrel (or housing) and piston within a housing, with a piston rod extending through an opening in the housing. As is commonly understood, the piston is moved within the housing by pumping fluid into the housing on one side of the piston at a time. Although not illustrated in detail, in the depicted embodiment, the housing of the hydraulic cylinders are connected to the swash plate 64 and the piston rod is connected to the frame 12 of the helicopter. The control valve 92 is coupled to the housing of the hydraulic cylinders and includes a spool moveable within a valve body to control the flow of fluid into the hydraulic cylinders, as is commonly understood. The control actuator 94 is connected to the spool within the control valve 92 to control the movement of the valve body therein.

Figure 5:
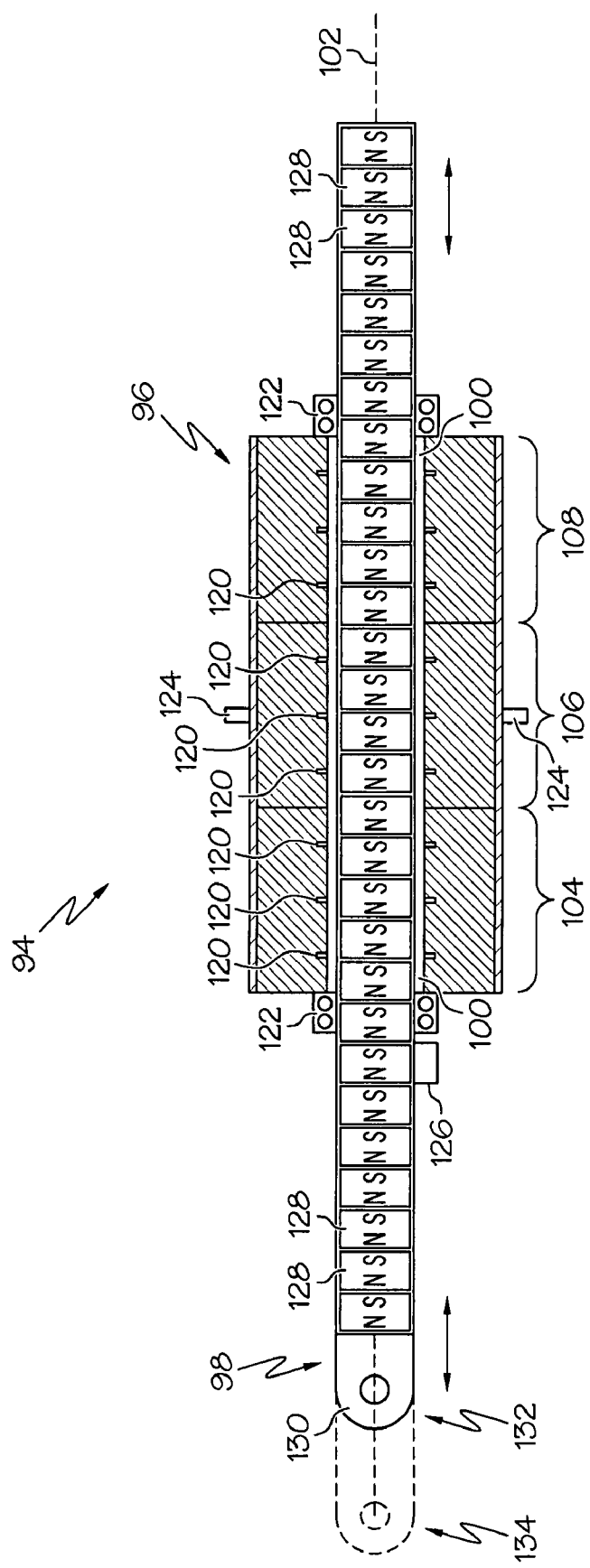
FIG. 5 is a cross-sectional side view of a control actuator within the rotor controls of FIG. 4.
Figure 6:
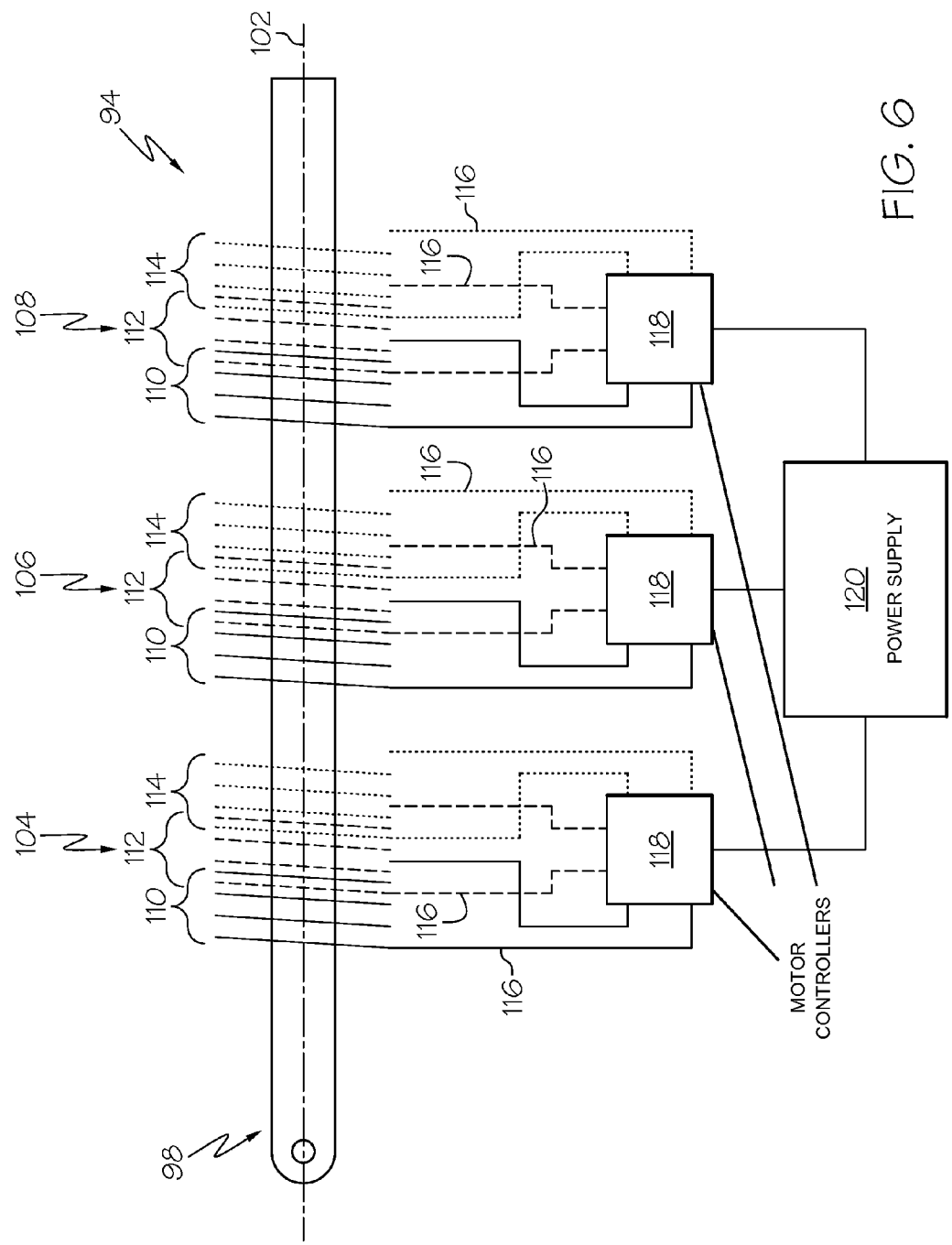
FIG. 6 is a cross-sectional schematic view of the control actuator of FIG. 6, as well a system to control and power the actuator.
Figure 7:
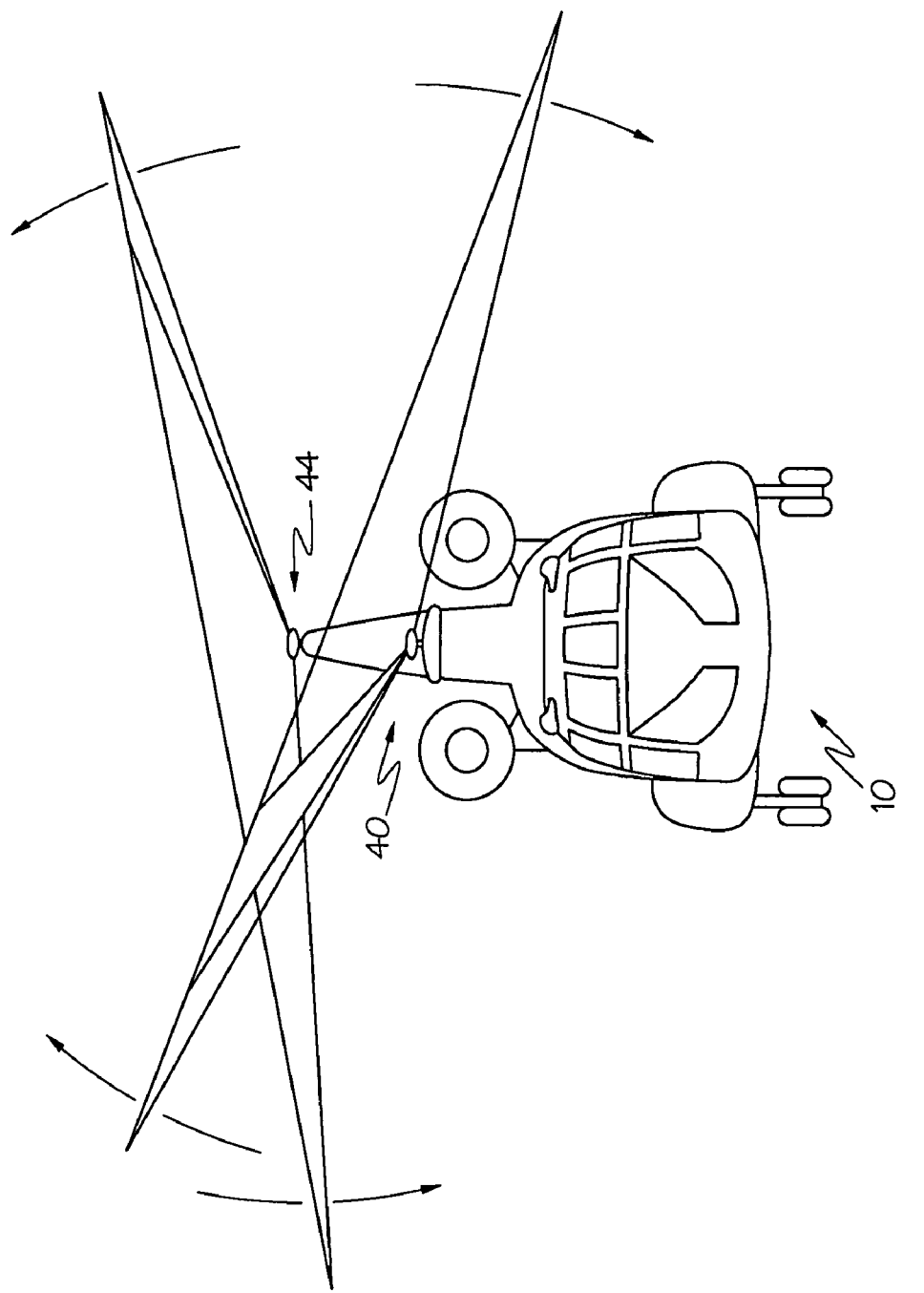
FIG. 7 is a front view of the helicopter of FIG. 2 illustrating actuation of the rotor assemblies thereof.

FIGS. 5 and 6 illustrate one of the control actuators 94 in greater detail. In one embodiment, the control actuator 94 is a linear motor and includes a stator assembly 96 and an armature (or shaft) 98. The stator assembly 96 is cylindrically shaped and has a shaft opening 100 extending therethrough along a central axis 102 thereof. The stator assembly 96 includes first, second, and third stators (or stator portions or coil sets or winding sets) 104, 106, and 108. In the depicted embodiment, the stators 104, 106, and 108 have substantially identical dimensions (i.e., diameter, length, etc.) and are stacked axially (i.e., in a direction substantially parallel to the axis 102) around the axis 102 such that first and second portions of only one of the stators 104, 106, and 108 lie on opposing sides of each portion of the axis 102.

As shown schematically in FIG. 6, the stators 104, 106, and 108 are electrically isolated from each other and include first, second, and third phase windings (or coils) 110, 112, and 114. The windings 110, 112, and 114 are formed from conductive wire 116 wrapped around the central axis 102, and as shown, are "skewed" (i.e., at least partially overlap or are "intertwined"). That is, each winding 110, 112, and 114 has at least one winding portion 116 that is placed between (at least in a direction parallel to the axis 102) the first and last winding portions of an adjacent winding. Although not specifically shown, the windings 110, 112, and 114 within each stators 104, 106, and 108 may be connected in, for example, a "Y" or a "Delta" configuration, as is commonly understood, and each may correspond to an independent phase of three-phase power, as is commonly understood. It should be noted that the conductive wire 116 used in all three stators 104, 106, and 108 may be substantially identical and is shown differently in FIG. 5 for clarity.

As shown, the control actuator 94 (and/or the computing system 26 shown in FIG. 1) also includes a control/power system having three motor controllers 118 and a power supply 120. Each of the motor controllers 118 is connected to the conductive wire 116, and thus the respective windings 110, 112, and 114, of one of the stators 104, 106, and 108, as well as the power supply 120 (e.g., through a power bus). Although not shown in detail, the motor controllers 118 are in operable communication with the computing system 26 and may include microprocessors and/or other integrated circuits capable of receiving direct current (DC) power from the power source and providing alternating current (AC) power in suitable durations to each wire 116, as is commonly understood.

Referring again to FIG. 5, the stators 104, 106, and 108 may substantially form a housing for the control actuator 94. The control actuator 94 may also include commutation sensors, or field position sensors, 120 (e.g., Hall effect sensors) within the stators 104, 106, and 108, linear bearings 122 connected to the housing at opposing ends of the shaft opening 100, gimbal pivots 124 connected to opposing sides of the housing, and a shaft position sensor 126, which may be placed proximate the shaft 98 and coupled to the stators 104, 106, 108. Although not shown, the housing (and the control actuator 94) is pivotably connected to the frame 12 through the gimbal pivots 124.

The shaft 98 is a substantially elongate extending through the shaft opening 100 of the stator assembly 96 (or the housing) and in a direction substantially parallel to the axis 102. The shaft, or magnet assembly, 98 includes a plurality of magnets 128 each having a first, or north (N), pole and a second, or south (S), pole. As shown, the magnets are arranged such that each of the poles is positioned between poles of the opposite polarity and the poles of the magnets 128 are aligned with the axis 102, or axially aligned (i.e., a line extending through the poles is congruent with the axis 102). In the exemplary embodiment shown, each magnet 128 has a length (i.e., a dimension in a direction parallel to the axis 102) that is approximately one fifth of the length of the stators 104, 106, and 108. Although not specifically shown, the shaft 98 is connected to the control valve 92 at an end 130 thereof to complete a flight control system including the flight controls 22, the computing system 26, the rotor assemblies 40 and 44, and the rotor assembly controls 42 and 46.

During operation, referring to FIG. 2, the turbine engines 48 provide power to the forward and aft rotor assemblies 40 and 44 through the transmissions 50, 52, and 54 and the shafts 56, 58, and 60, causing the rotors 62 to rotate, thus generating lift and allowing the helicopter 10 to fly, as is commonly understood. Referring to FIG. 1, to control the helicopter 10, the user 28 provides input to the flight controls 22 from which command signals are sent to the computing system 26. The computing system 26 translates the command signals into appropriate reactions taken by the forward and aft rotor controls 42 and 46.

Referring to FIG. 2, generally, control of the helicopter 10 is accomplished by tilting the swash plate(s) 64 using the servocylinders 90. Referring again to FIG. 1, upon receiving a command signal from the flight controls, such a cyclic stick, a collective lever, and/or a rudder pedal (i.e., generated in response to manual input from the pilot), the computing system 26 generates a control signal which is sent to the rotor controls 42 and 46 to control the control actuator 94. Referring now to FIG. 6 the control signal is sent to at least one of the motor controllers 118, which provides appropriate power through its respective conductive wire 116 to the windings 110, 112, 114. Because of the interaction between the current flowing through the windings 110, 112, and 114 and the magnetic field generated by the magnets 128 (FIG. 5), a Lorentz force is generated between the stator assembly 96 and the shaft 98, causing the shaft 98 to move relative to the stator assembly 96 through the shaft opening 100 in a direction substantially parallel to the axis 102 (e.g., from a first position 132 to a second position 134). As such, the control actuator 94 may be commanded to operate the control valve 92. It will be appreciated by one skilled in the art that the commutation of the stators 104, 106, and 108 may be facilitated by the commutation sensors 120 (e.g., to detect the magnetic field generated by the magnets 128) and the shaft position sensor 126 (e.g., to detect an absolute position of the shaft 98 relative to the housing) and corresponding signals generated by the sensors 120 and 126 and received by the computing system 26 and/or motor controllers 118.

As is commonly understood, translation of the shaft 98 causes the control valve spool to be moved, which in turn causes fluid ports to be placed in communication internal to the valve. This results in fluid being directed to one side of the actuator, which causes the housing to move relative to the piston. In one embodiment, as is commonly understood, by moving the spool, the entire servocylinder and control valve body move as a single unit to a position such that there is no longer a flow of hydraulic fluid within the control valve (i.e., a null position of the valve is reestablished automatically).

Referring again to FIG. 4, the actuation of the servocylinder 90 causes the swash plate 64 to move relative to the frame 12 of the helicopter 10. It should be noted that movement of the swash plate 64 may refer to the swash plate 64 tilting relative to a longitudinal axis of the helicopter 10 and/or moving perpendicularly to the longitudinal axis. The interconnection between the swash plate 64 and the rotor 62 shown in FIG. 3 (e.g., through the swash plate arms 82), results in the hub 66 and/or the blades 68 moving (e.g., tilting, raising, lowering etc.) with the swash plate 64. Movement of the rotor 62, hub 66, and/or blades 68 may refer to the rotor 62 being tilted by movement of the swash plate 64 and/or the pitch of the blades 68 being altered by movement of the swash plate 64. In the example shown in FIG. 7, the forward rotor assembly 40 is in a first rotor position (e.g., tilted to the helicopter's 10 port side), and the aft rotor assembly 44 is in a second rotor position (e.g., tilted to the helicopter's 10 starboard side). Through various combinations of movements of the swash plates 64 at both the forward and aft rotor assemblies 40 and 44, the helicopter 10 may be maneuvered in virtually any manner desired.

In one embodiment, at least in a first mode of operation, only the first stator 104, along with the corresponding windings 110, 112, and 114 and motor controller 118, is used to actuate the control actuator 94, while the second and third stators 106 and 108 remain inactive. That is, in this first mode of operation, only the first stator 104 is commutated (or selectively energized). However, in the event that the first stator 104 (and/or the corresponding windings 110, 112, and 114 and motor controller 118) is damaged, the computing system 26 (FIG. 1) deactivates the first stator 104 and uses the second and/or third stators 106 and 108 to operate the control actuator 94, in a manner similar to that described above. Likewise, if the second stator 106 is damaged, the third stator 108 is then used to operate the control actuator 94, and thus maintain control of the flight of the helicopter 10.

One advantage of the system described above is that the helicopter is controlled via electric actuators (i.e., "fly-by-wire") instead of conventional, mechanical, fly-by-line systems. As a result, the flight control system provided greatly reduces the number of components used in the manufacturing of the helicopter. Thus, manufacturing costs are also reduced. Additionally, the reduction in components reduces the overall weight of the helicopter, which reduces operational costs (e.g., fuel savings) and improves performance. Further, because of the redundancy created by the multiple sets of coils used in the control actuators, as well as the simple linear design, the aforementioned benefits are realized without sacrificing reliability or safety, as the chances that the actuator will fail or become jammed are greatly reduced.

Other embodiments of the flight control system may be used in rotorcrafts other than helicopters, such as autogyros, gyrodynes, and tiltrotors. Although the embodiment described above incorporates the flight control system on the main rotors on a tandem helicopter, it should be understood that the control actuator could be used for other rotors and/or flight control surfaces on rotorcraft, such as a tail rotor or ailerons. The motor controllers, as well as the power supply, may be incorporated into a single component, such as an integrated circuit. The stator portions may be arranged differently than as described above. For example, the stator portions could be radially stacked rings in which first and second portions of all of the stator portions lie on opposing sides of one portion of the axis. The magnets may be arranged differently than as described above. For example, the magnets could be radially aligned (i.e., arranged such that a line extending through the poles is perpendicular to the axis). Furthermore, it should be understood that other actuator, spool valve, and servocylinder control configurations other than that described above could be used. For example, the spool valve and the servocylinder could be arranged such that the null position of the valve is not automatically reestablished. In such an embodiment, after the servocylinder is moved the desired amount, the actuator is moved back to its original position to readjust the spool valve to stop the flow of hydraulic fluid through the servocylinder.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A flight control system for a rotorcraft having a frame and a rotor comprising:
   a user input device coupled to the frame; and
   a motor in operable communication with the user input device and coupled to the frame and the rotor, the motor comprising
   a plurality of winding sets, and
   an armature coupled to the plurality of winding sets and comprising a plurality of magnets, the plurality of winding sets and the armature being configured such that when one or more of the winding sets is selectively energized, the armature moves relative to the one or more of the winding sets, said movement of the armature causing the rotor to move relative to the frame.

2. The flight control system of claim 1, further comprising a power supply coupled to the plurality of winding sets.

3. The flight control system of claim 2, wherein selectively energizing the one or more of the winding sets comprises commutating the one or more of the winding sets.

4. The flight control system of claim 3, wherein the plurality of winding sets each have first and second portions on opposing sides of the armature.

5. The flight control system of claim 4, wherein each of the plurality of winding sets has an opening therethrough, and the armature extends through the openings of the plurality of winding sets.

6. The flight control system of claim 5, wherein said movement of the armature is along an axis.

7. The flight control system of claim 6, wherein each of the plurality of winding sets comprises a first, second, and third conductive wires, each of the conductive wires forming a coil around the axis, and wherein the coils formed from the first, second, and third conductive wires at least partially overlap.

8. The flight control system of claim 7, further comprising a position sensor coupled to the frame to detect a position of the armature and wherein the commutation of the one or more windings is based on the position of the armature.

9. The flight control system of claim 8, wherein the plurality of magnets have first and second poles aligned with the axis.

10. The flight control system of claim 8, wherein the plurality of magnets have first and second poles aligned radially with the axis.

11. A flight control system for a rotorcraft comprising:
    a flight control device configured to receive user input and generate a flight control signal representative thereof;
    a motor in operable communication with the flight control device comprising a plurality of winding sets, and an armature coupled to the plurality of winding sets and comprising a plurality of magnets, the plurality of windings sets and the magnets being configured such that when one or more of the winding sets is selectively energized, the armature moves relative to the one or more winding sets; and a motor controller in operable communication with the flight control device and the motor and configured to receive the flight control signal and selectively energize the one or more of the winding sets based on the flight control signal.

12. The flight control system of claim 11, wherein the flight control device comprises at least one of a cyclic stick, a collective lever, and a rudder pedal.

13. The flight control system of claim 12, wherein the plurality of magnets are aligned with an axis, and said movement of the armature relative to the one or more of the winding sets is in a direction substantially parallel with the axis.

14. The flight control system of claim 13, wherein each of the plurality of winding sets comprises a first, second, and third conductive wires, each of the conductive wires forming a coil around the axis.

15. The flight control system of claim 14, wherein the coils formed from the first, second, and third conductive wires at least partially overlap.

16. The flight control system of claim 15, wherein selectively energizing the one or more of the winding sets comprises commutating the one or more of the winding sets, further comprising a position sensor coupled to the frame to detect a position of the armature, and wherein the commutation of the one or more windings is based on the position of the armature.

17. A method for controlling a rotorcraft comprising:

receiving a manual user input with a flight control device;

generating a flight control signal representative of the manual user input; and operating an electric motor based on the flight control signal, the electric motor comprising a plurality of winding sets, and an armature coupled to the plurality of winding sets and comprising a plurality of magnets, the plurality of windings sets and the magnets being configured such that when one or more of the winding sets is selectively energized, the armature moves relative to the one or more of the winding sets.

18. The method of claim 17, wherein the flight control device comprises at least one of a cyclic stick, a collective lever, and a rudder pedal.

19. The method of claim 18, wherein said selectively energizing the one or more of the winding sets comprises commutating the one or more of the winding sets.

20. The method of claim 19, wherein said movement of the armature relative to the one or more of the winding sets causes a rotor on the rotorcraft to move from a first position to a second position.

* * * * *